(12) United States Patent
Chou et al.

(10) Patent No.: US 11,949,270 B2
(45) Date of Patent: Apr. 2, 2024

(54) BATTERY MODULE AND METHOD FOR SUPPRESSING BATTERY SWELLING

(71) Applicant: Acer Incorporated, New Taipei (TW)

(72) Inventors: Shuo-Jung Chou, New Taipei (TW); Chuan-Jung Wang, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 296 days.

(21) Appl. No.: 17/503,550

(22) Filed: Oct. 18, 2021

(65) Prior Publication Data
US 2022/0337077 A1    Oct. 20, 2022

(30) Foreign Application Priority Data
Apr. 16, 2021 (TW) .................. 110113739

(51) Int. Cl.
*H02J 7/00* (2006.01)
*H01M 10/44* (2006.01)
*H01M 10/48* (2006.01)

(52) U.S. Cl.
CPC ......... *H02J 7/00712* (2020.01); *H01M 10/44* (2013.01); *H01M 10/48* (2013.01)

(58) Field of Classification Search
CPC ..... H02J 7/00712; H01M 10/44; H01M 10/48
USPC ......................................... 320/134
See application file for complete search history.

(56) References Cited

U.S. PATENT DOCUMENTS

2016/0064780 A1*  3/2016  Jarvis ................ H01M 10/4257
429/61

FOREIGN PATENT DOCUMENTS

KR        20170076053        * 12/2015

OTHER PUBLICATIONS

Machine translation of KR 20170076053, 7 pages (Year: 2015).*

* cited by examiner

*Primary Examiner* — Nathaniel R Pelton
(74) *Attorney, Agent, or Firm* — Edell, Shapiro & Finnan, LLC (57) ABSTRACT

A battery module for monitoring and suppressing battery swelling and interacting with a charging device includes a battery cell disposed in a nonconductive housing, a conductive label affixed to the nonconductive housing, a switch, and a controller. The battery cell is charged via a supply voltage from a charging device. The switch is coupled between the battery cell and the conductive label. The controller detects a resistance variation value ΔR of the conductive label as result of swelling of the nonconductive housing, and generates a corresponding control voltage. As the resistance of the conductive label increases, the supply voltage may be adjusted downward according to the control voltage. If the resistance variation value ΔR conductive label is greater than or equal to a predetermined threshold, the controller closes the switch, and the battery cell may then fully discharge through the conductive label.

15 Claims, 8 Drawing Sheets

BATTERY MODULE AND METHOD FOR SUPPRESSING BATTERY SWELLING

This application claims the benefit of Taiwan Application Serial No. 110113739, filed Apr. 16, 2021, the subject matter of which is incorporated herein by reference in its entirety.

TECHNICAL FIELD

The present invention is directed to safety mechanisms for a battery and, more particularly, to monitoring and suppressing battery swelling.

BACKGROUND

Battery swelling, while not common, may pose a significant risk. Battery swelling is typically caused by a build-up of heat and gas inside the housing of the battery, and is often a result of overcharging, a manufacturer defect, a deep discharge, or damage to the battery. Battery swelling may also be a precursor to a fire or explosion, leading to damage to an electronic device and/or bodily harm. Thus, there is a need to accurately monitor battery swelling before a dangerous condition occurs and, to the extent possible, implement techniques to help diminish the risk of leakage, fire, or explosion.

SUMMARY

Embodiments of the present invention provide a battery module for monitoring and suppressing battery swelling and interacting with a charging device. An embodiment includes a battery cell disposed in a nonconductive housing, a stretchable conductive label affixed to the nonconductive housing, a switch, and a controller. The battery cell is charged via a supply voltage from a charging device. The switch is coupled between the battery cell and the conductive label, which is may be grounded. The controller detects a resistance variation value $\Delta R$ of the conductive label as a result of swelling of the battery (and thus also the nonconductive housing), and generates a corresponding control voltage. As the resistance of the conductive label increases due to stretching, the supply voltage may be adjusted downward according to the control voltage. If the resistance variation value $\Delta R$ of the conductive label is greater than or equal to a predetermined threshold, the controller closes the switch, and the battery cell may then fully discharge through the conductive label.

BRIEF DESCRIPTION OF THE DRAWINGS

Embodiments are described herein in conjunction with the accompanying drawings, in which.

DESCRIPTION OF EXAMPLE EMBODIMENTS

Figure 1A:
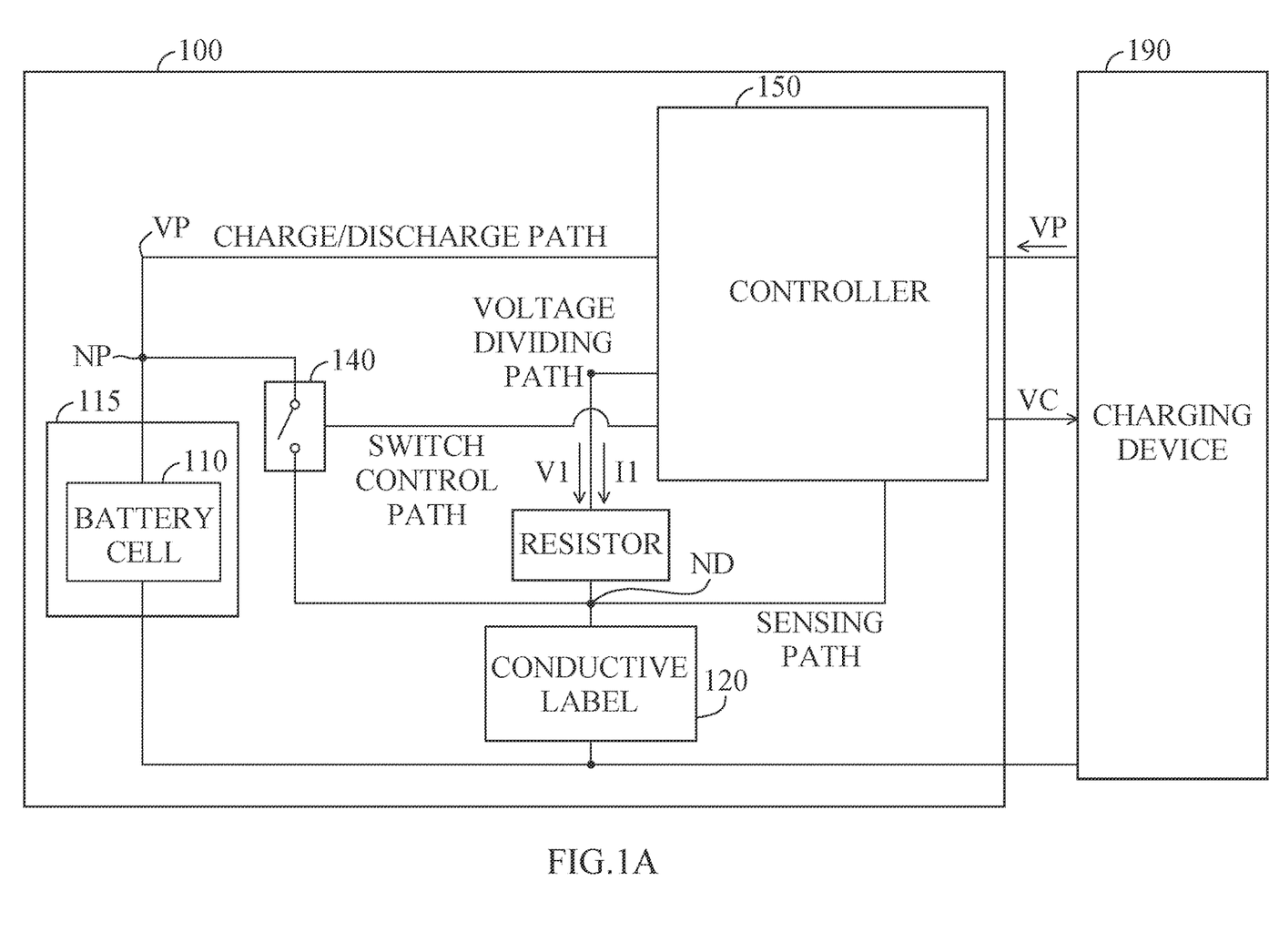
FIG. 1A is a schematic diagram of a charging device and a battery module according to an example embodiment of the present invention.

FIG. 1A is a schematic diagram of a charging device 190 and a battery module 100 according to an example embodiment of the present invention. The battery module 100 may be a component of a mobile device such as a smart phone, a tablet computer, or a notebook computer, among other devices. As shown in FIG. 1A, the battery module 100 includes a battery cell 110, a conductive label 120, a resistor 130, a switch 140 (controlled via the switch control path), and a controller 150. The charging device 190 need not be a part of the battery module 100, but, as is explained further below, its operation can be controlled by the battery module 100. Those skilled in the art will appreciate that, although not shown in FIG. 1A, the battery module 100 may power other elements such as a display, a speaker, a touch control module, etc., and may be enclosed in an appropriate case.

The battery cell 110 includes a non-conductive housing 115, the shape and size of which are not limited in the context of the present invention. The conductive label 120 may be arranged on (i.e., applied to) a surface of the non-conductive housing 115. The charging device 190 is connected so as to provide charging power to the battery cell 110. For example, the battery cell 110 can be charged, via the charge/discharge path, by the charging device 190 with a supply voltage VP.

Figure 2:
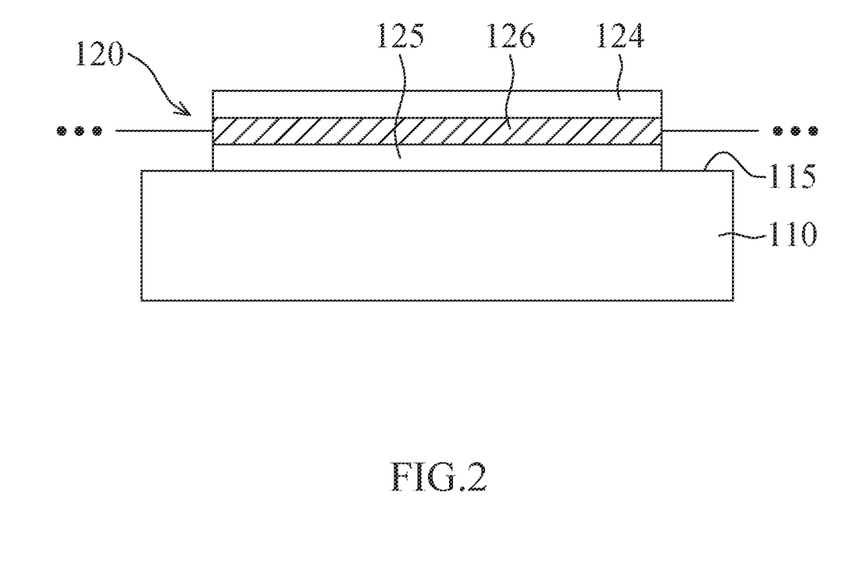
FIG. 2 is a partial cross-sectional view of components of the battery module according to an example embodiment of the present invention.

FIG. 2 is a partial cross-sectional view of components of the battery module according to an example embodiment of the present invention. In the embodiment of FIG. 2, the conductive label 120 includes a polyester plastic (e.g., polyethylene terephthalate, PET) layer 124, an insulating glue layer 125, and a conductive layer 126. The conductive layer 126 is disposed between the polyester plastic layer 124 and the insulating glue layer 125, and the insulating glue layer 125 is adhered to the surface of the non-conductive housing 115. As a non-limiting example, safety specification information for the battery cell 110 may be printed on the polyester plastic layer 124. In other embodiments, if the safety specification information for the battery cell 110 is printed on the non-conductive housing 115, the polyester plastic layer 124, the insulating glue layer 125, and the conductive layer 126 can all be implemented with transparent materials.

Those skilled in the art will appreciate that while the invention is described in the context of a stretchable, conductive label, any stretchable element whose resistance changes under tension can also be employed in the embodiments described herein.

Figure 5A:
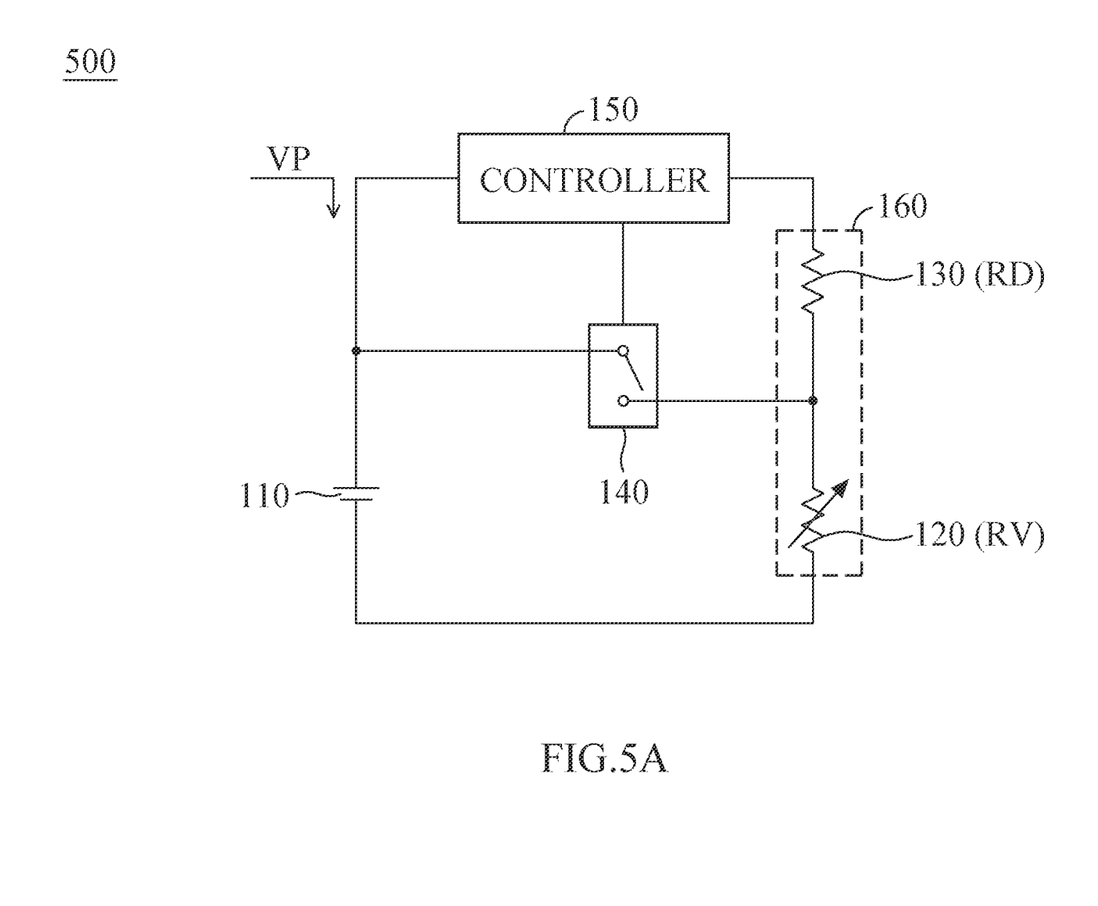
FIG. 5A and FIG. 5B show equivalent circuit diagrams of the battery module of FIG. 1A according to an example embodiment of the present invention.

Referring to FIG. 1A and FIG. 2, in an embodiment, the resistor 130 is connected in series with the conductive layer 12 of the conductive label 120 to form a voltage divider circuit 160 along the voltage dividing path (see, also, FIG. 5A). For example, the resistor 130 and the conductive layer 126 of the conductive label 120 can both be connected to an internal node ND, where the internal node ND is located between the resistor 130 and the conductive layer 126 of the conductive label 120.

The switch 140 is connected in series between the battery cell 110 and the conductive layer 126 of the conductive label 120. For example, one terminal of the switch 140 may be connected to a receiving node NP of the battery cell 110, and the other terminal of the switch 140 may be connected to the conductive layer 126 of the conductive label 120 at the internal node ND. The receiving node NP can be charged by the supply potential VP, which is received from the charging device 190. The switch 140 can be selectively turned on (closed) or disconnected (opened), and its switching state can be controlled by the controller 150.

The controller 150 may be a gas gauge chip or an embedded controller, as non-limiting examples. In accordance with an embodiment, the controller 150 is configured to detect, via the sensing path, a resistance variation value ΔR of the conductive label 120 using the resistor 130, and, in response, generate a control potential VC (discussed further below) corresponding to the resistance variation value ΔR. For some embodiments, the controller 150 determines the resistance variation value ΔR of the conductive label 120 by analyzing a voltage V1 and a current I1 of the voltage divider circuit 160. For example, using Ohm's Law, the controller 150 can calculate the total resistance of the resistor 130 and the conductive label 120 based on the voltage V1 and the current I1. Because the resistance value of the resistor 130 is known, the resistance value of the conductive layer 126 and, thus, its resistance value variation ΔR can be accurately calculated by the controller 150.

Figure 1B:
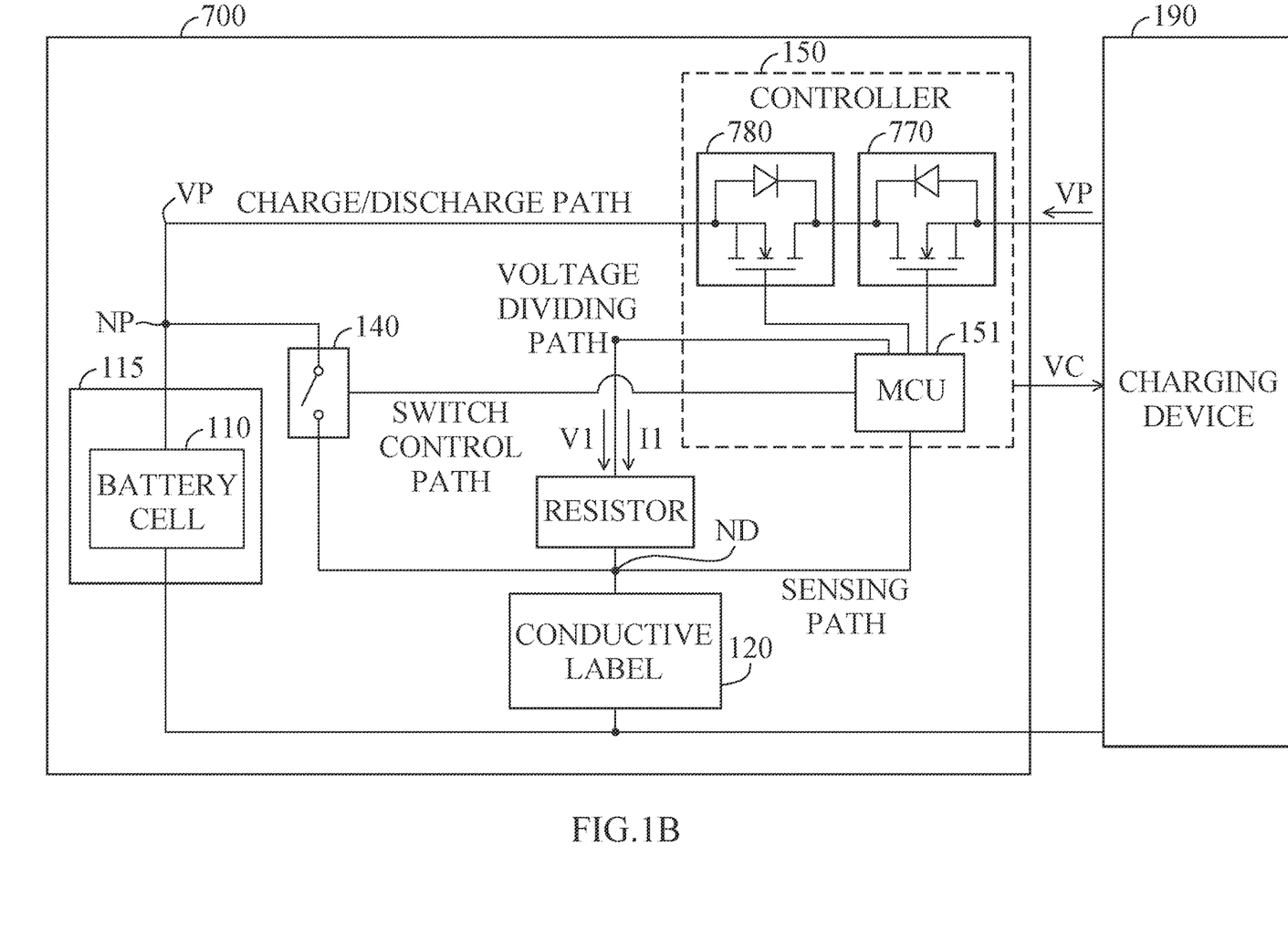
FIG. 1B is a schematic diagram of the charging device and battery module of FIG. 1A including details of a controller according to an example embodiment of the present invention.

FIG. 1B is a schematic diagram of the charging device 190 and a battery module 700, similar to that shown in FIG. 1A, and further including details of the controller 150 according to an example embodiment of the present invention. In the embodiment of FIG. 1B, the controller 150 of the battery module 700 further includes a micro-control unit (MCU) 151, a discharging switch 770 and a charging switch 780, wherein the receiving node NP of the battery cell 110 receives the supply potential VP from the charging device 190 via the discharging switch 770 and the charging switch 780. Switching operations of the discharging switch 770 and the charging switch 780 are controlled by the MCU 151 (which itself may be powered from the charging device 190 and/or the battery cell 110). For example, when the battery cell 110 is completely discharged, the controller 150 can turn off the discharging switch 770, and when the battery cell 110 is completely charged, the controller 150 can turn off the charging switch 780. The remaining features of the battery module 700 in FIG. 1C are similar to those of the battery module 101 in FIG. 1B.

Table 1 below shows the On/Off states of the discharging switch (MOSFET) 770 and the charging switch (MOSFET) 780 given the state of charge (SOC) of the battery cell 110.

TABLE 1

| SOC (State of Charge) | Charging MOSFET (780) | Discharging MOSFET (770) |
| --- | --- | --- |
| 100% (Fully Charged) | OFF | ON |
| 99~1% | ON | ON |
| 0% (Fully Discharged) | ON | OFF |

Regarding the On/Off states in Table 1, it is noted that the switches 770, 780 control the charge path, the discharge path or both. When the state of charge (SOC) is 100% (Fully Charged), discharging MOSFET 770 is ON and charging MOSFET 780 is OFF. In this state, only the discharge path is permitted. And, at this time, the current from the battery cell 110 passes through the body diode of the charging MOSFET 780 to the discharging MOSFET 770 to the charging device 190.

When SOC is 0%, discharging MOSFET 770 is OFF and charging MOSFET 780 is ON. In this state, only the charge path is permitted. And, at this time, the current from the charging device 190 passes through the body diode of the discharging MOSFET 770 to the charging MOSFET 780 to the battery cell 110.

When SOC is 99-1%, discharging MOSFET 770 is ON and charging MOSFET 780 is ON. In this state, both the charging path and the discharging path are permitted.

As will be explained more fully below, the controller 150, via MCU 151, not only controls the discharging switch 770 and the charging switch 780, but also generates and sends a control voltage VC to charging device 190.

Figure 3A:
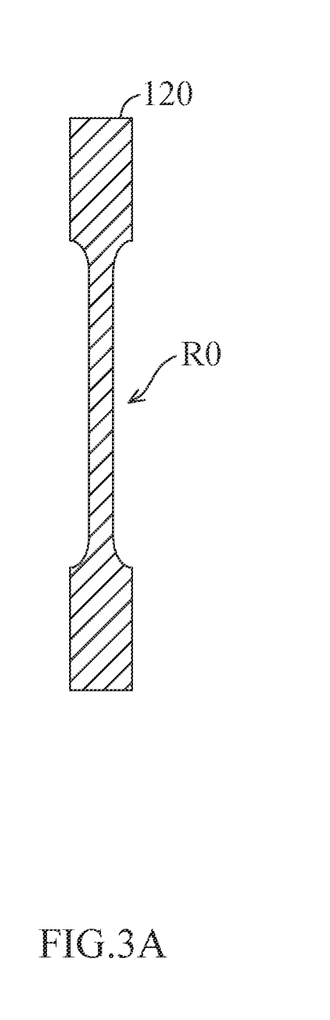
FIG. 3A, FIG. 3B, and FIG. 3C are top views of a conductive label in different stages of expansion according to an example embodiment of the present invention.
Figure 3B:
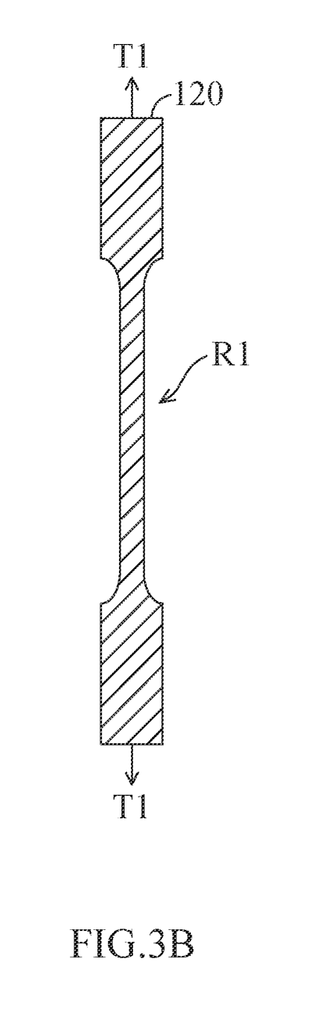
Figure 3C:
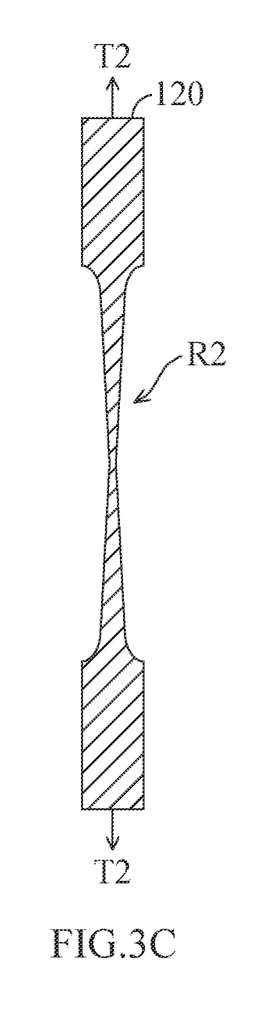

FIG. 3A, FIG. 3B, and FIG. 3C are top views of a conductive label 120 in different stages of stretch or expansion according to an example embodiment of the present invention. For the stage shown in FIG. 3A, the battery cell 110, and more specifically, the non-conductive housing 115, to which the conductive label 120 is affixed, has not yet expanded, such that the conductive label 120 is shown according to its original shape. At this stage, the conductive layer 126 of the conductive label 120 has an initial resistance value R0.

For the stage shown in FIG. 3B, the battery cell 110 and non-conductive housing 115 have slightly expanded, such that the two ends of the conductive label 120 are subjected to a relatively small first tension force T1. As a result, the conductive label 120 is expanded, or stretched, and the conductive layer 126 of the conductive label 120 will thus exhibit a first resistance value R1.

For the stage shown in FIG. 3C, the battery cell 110 and non-conductive housing 115 have been more severely expanded or stretched, such that the two ends of the conductive label 120 are subjected to a relatively large second tension force T2. As a result, the conductive label 120 will be correspondingly further extended or stretched, and the conductive layer 126 of the conductive label 120 will exhibit a second resistance value R2.

Figure 4:
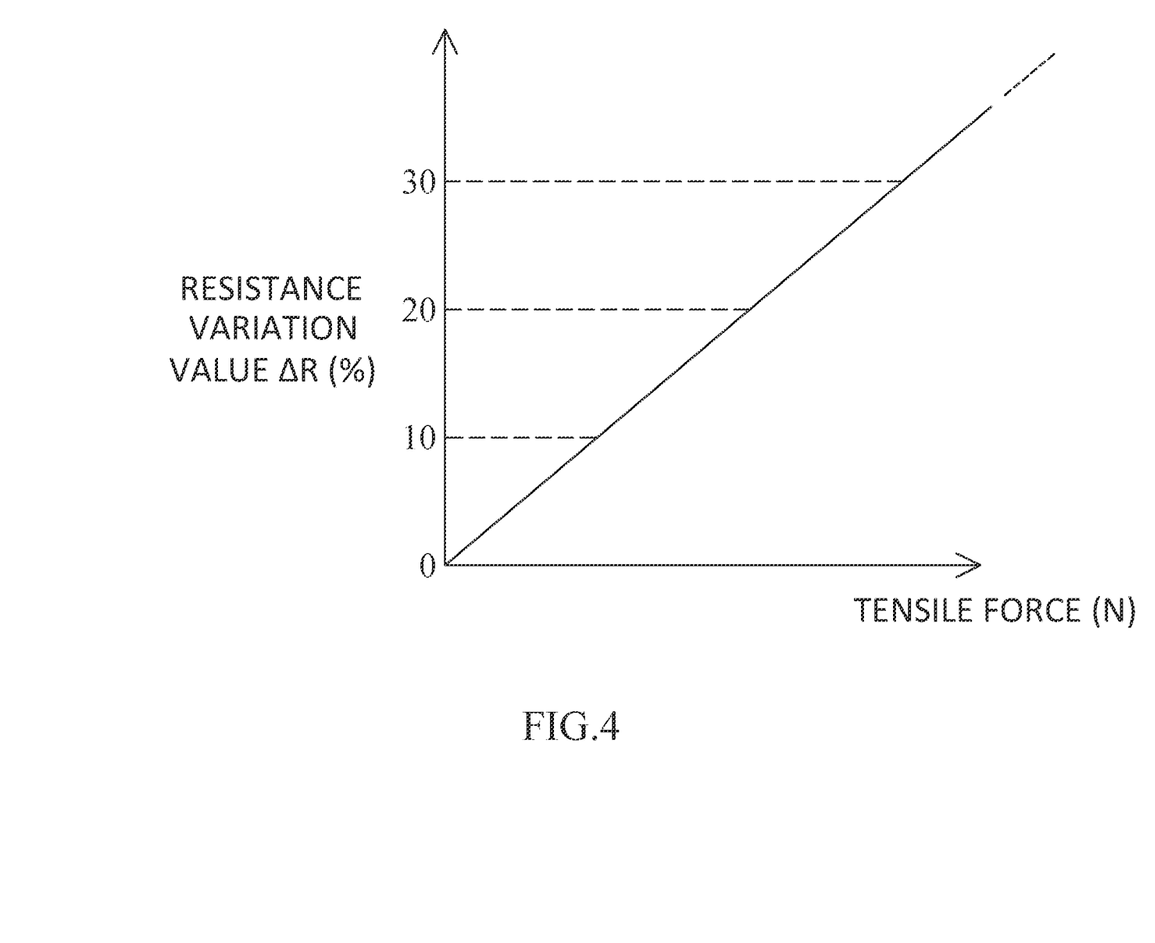
FIG. 4 is a graph showing a relationship between the tensile force on the conductive label and the resistance variation value $\Delta R$ of the conductive label according to an example embodiment of the present invention.

FIG. 4 is a graph showing a relationship between the tensile force (N) and the resistance variation value ΔR of the conductive label 120 according to an example embodiment of the invention. According to the graph in FIG. 4, the resistance variation value ΔR of the conductive label 120 (and more particularly the conductive layer 126) is proportional to the tension on, or stretching of, the conductive label 120, i.e., the more stretching, the higher the resistance variation value ΔR. Although shown as a linear relationship, the relationship could also be non-linear. Thus, the extent to which the battery cell 110 and non-conductive housing 115 have swelled can be represented by the resulting stretched conductive label 120, and the extent to which the conductive label 120 has stretched can be determined by monitoring its resulting increased resistance value (that is, the resistance variation value ΔR).

More specifically, as shown in FIGS. 3A, 3B, and 3C, the first resistance value R1 is greater than the initial resistance value R0, and the second resistance value R2 is greater than the first resistance value R1. In some embodiments, the resistance variation value ΔR can be defined as a difference between the current resistance value of the conductive label 120 and the initial resistance value R0 (for example, the current resistance value minus the initial resistance value R0), but the invention should not be considered limited to such a definition. The resistance variation value ΔR may also be represented as a percentage.

As mentioned above, the controller 150 can detect the resistance variation value ΔR of the conductive label 120 and generate, in response thereto, the control voltage VC. If the resistance value of the conductive label 120 increases (and thus the resistance variation value ΔR becomes larger), this suggests that the battery cell 110 and non-conductive housing 115 may have expanded due to swelling. In response, the supply potential VP of the charging device 190 may be adjusted in accordance with the control voltage VC (signaling, for example, no change or a lower supply potential VP) to extend the life of the battery cell 110. In some embodiments, the relationship between the supply potential VP (controlled by the control voltage VC) and the resistance variation value ΔR may be as set forth in Table 2 below.

TABLE 2

Relationship between supply voltage VP and Variation ΔR

| Step | Variation ΔR | Supply Voltage VP |
| --- | --- | --- |
| Initial | 0% ≤ ΔR < +10% | 4.4 V |
| $1^{st}$ Step | +10% ≤ ΔR < +20% | 4.35 V |
| $2^{nd}$ Step | +20% ≤ ΔR < +30% | 4.3 V |
| $3^{rd}$ Step | +30% ≤ ΔR < +40% | 4.25 V |
| $4^{th}$ Step | +40% ≤ ΔR < +50% | 4.2 V |
| $5^{th}$ Step | +50% ≤ ΔR < +55% | 4.15 V |

According to Table 2, the initial supply potential VP can be set to 4.4V, and whenever the resistance value of the conductive label 120 increases by, e.g., 10%, the supply potential VP can be reduced by a corresponding 0.05V. Those skilled in the art will appreciate that although Table 2 divides the 0-55% range of resistance variation value ΔR into six distinct groups or steps, it is possible to divide that range into fewer or more groups or steps, as desired.

In order to protect the battery cell 110 from (further) damage, the controller 150 may further compare the resistance variation value ΔR of the conductive label 120 with a predetermined threshold. This predetermined threshold can be regarded as an upper safety limit for the overall design. Thus, for example, in a possible embodiment, the aforementioned predetermined threshold may be approximately equal to +55%. Once the resistance variation value ΔR reaches the predetermined threshold, the safety protection mechanism of the battery cell 110 can be triggered. The safety protection mechanism is discussed next in connection with FIGS. 5A and 5B.

Figure 5B:
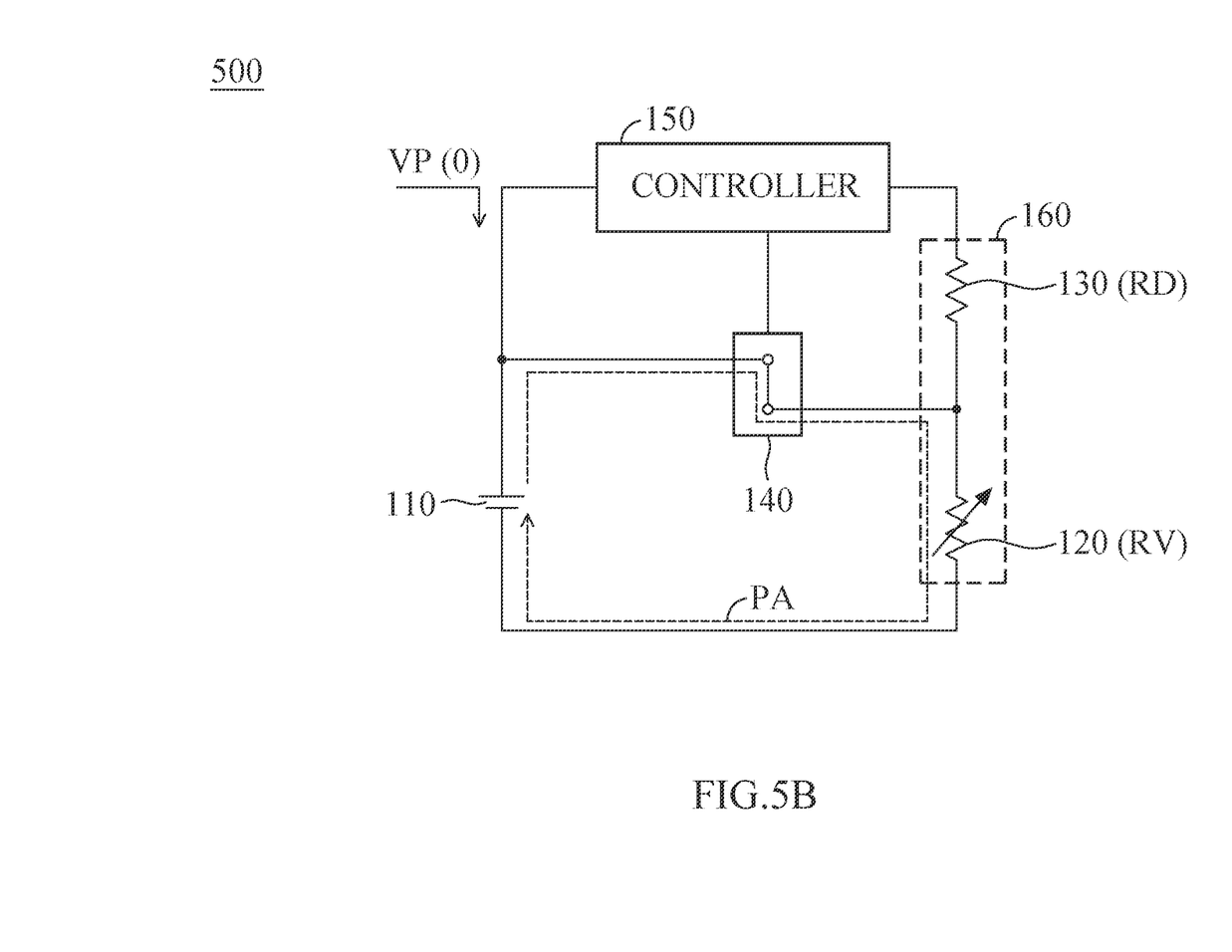

FIG. 5A and FIG. 5B show equivalent circuit diagrams of the battery module of FIG. 1A or FIG. 1B according to an example embodiment of the present invention. In FIG. 5A, the resistor 130 can be represented as a fixed resistor RD, and the conductive label 120 can be represented as a variable resistor RV (since its resistance value changes due to the expansion or swelling of the battery cell 110/non-conductive housing 115). In the embodiment of FIG. 5A, the resistance variation value ΔR of the conductive label 120 is less than the predetermined threshold mentioned above. As such, the safety protection mechanism is not yet triggered, and the switch 140 remains in the off state.

In FIG. 5B, the resistance variation value ΔR of the conductive label 120 is greater than or equal to the predetermined threshold. Accordingly, the safety protection mechanism is triggered in which the controller 150 turns on the switch 140. As a result, the battery cell 110 can be completely discharged through the conductive label 120 (as shown by a loop path PA in FIG. 5B). At the same time, the controller 150 can also control the charging device 190, via control voltage VC to reduce the supply potential VP to 0V. That is, if the battery cell 110 is severely swelled and the resistance variation value ΔR of the conductive label 120 is too high, the aforementioned safety protection mechanism, which causes the battery cell 110 to completely discharge (e.g., to ground), can prevent the battery cell 110 from accidentally catching fire and/or exploding.

In other embodiments, the battery modules 100, 700 may include two or more conductive labels 120, which are all disposed on the non-conductive housing 115 of the battery cell 110 and are connected in series with the resistor 130. The controller 150 can detect and calculate an average value of the resistance variation value ΔR of all the conductive labels 120, and this average value can be used for the resistance variation value ΔR. A judgment procedure using the average resistance variation value ΔR can reduce the probability of misjudgment by the controller 150.

Figure 6:
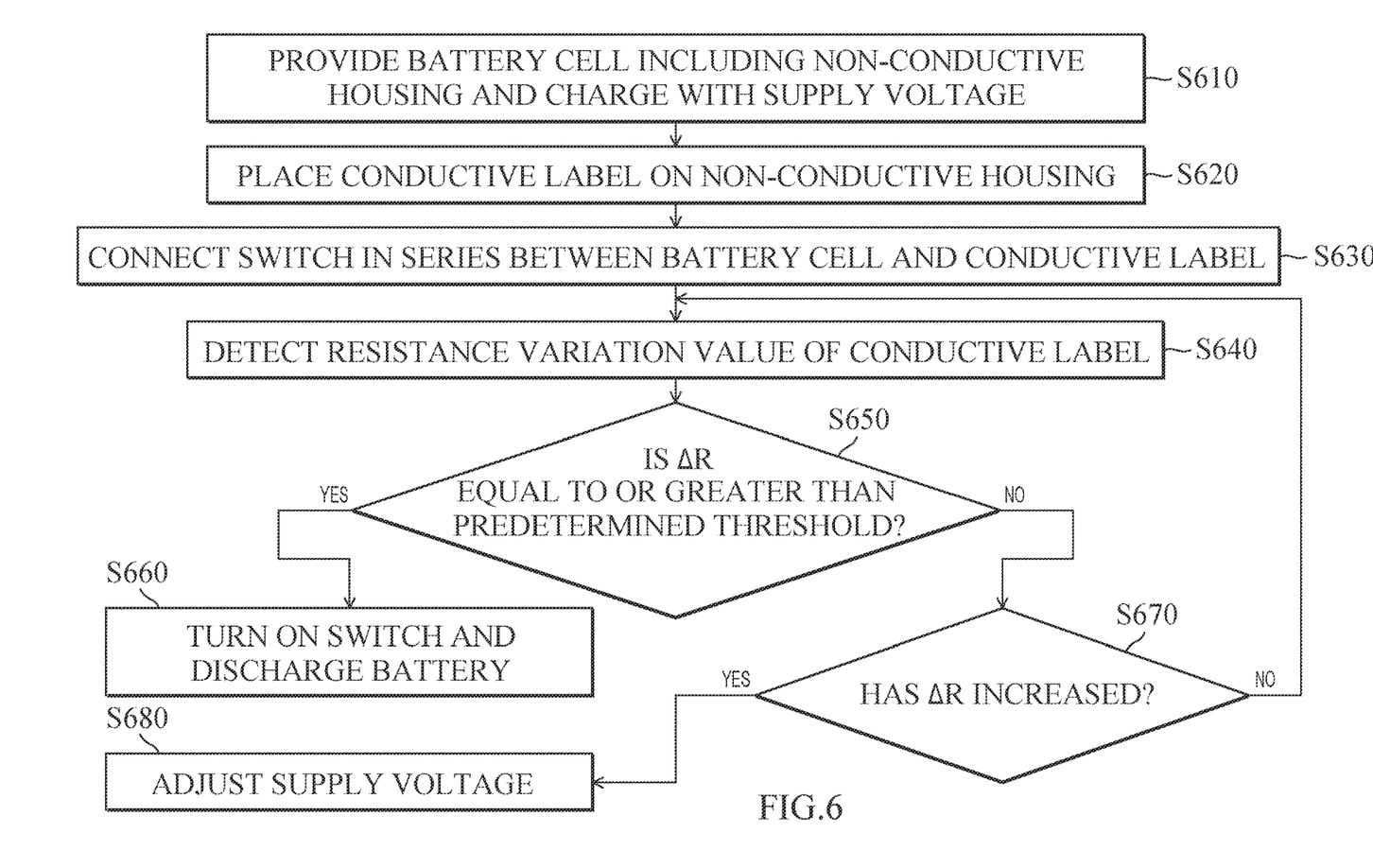
FIG. 6 is a flowchart depicting a series of operations for monitoring and responding to battery swelling according to an example embodiment of the present invention.

FIG. 6 is a flowchart depicting a series of operations for monitoring and responding to battery swelling according to an example embodiment of the present invention. In step S610, a battery cell is provided, wherein the battery cell includes a non-conductive housing, and the battery cell is charged by a supply potential. In step S620, a conductive label is placed on the non-conductive housing of the battery cell. In step S630, a switch is connected in series between the battery cell and the conductive label. In step S640, a resistance variation value ΔR of the conductive label is detected. In step S650, it is determined whether the resistance variation value ΔR of the conductive label is greater than or equal to a predetermined threshold. If yes, in step S660, the switch is turned on, so that the battery cell is completely discharged through the conductive label. If not, in step S670, it is determined whether the resistance variation value ΔR of the conductive label has increased (i.e., whether the change amount is greater than 0). If no, the procedure returns to step S640. If yes, in step S680, the supply potential is adjusted (for example, lowered or maintained) accordingly. Those skilled in the art will appreciate that the steps in FIG. 6 need not be performed in the precise sequence described.

In sum, the present invention provides a novel battery module and method, which can effectively monitor and suppress battery cell swelling. Generally speaking, the present invention has at least the advantages of improving safety, reducing manufacturing costs, and extending battery life. As such, it is particularly suitable for various applications including mobile communication devices, among others.

The above description is intended by way of example only.

What is claimed is:
1. A method comprising:
sensing a resistance variation value of a conductive stretchable element affixed to a nonconductive housing of a battery cell, wherein the resistance variation value changes in response to swelling of the nonconductive housing of the battery cell;
controlling a supply voltage delivered from a charging device, which is connected to the battery, in accordance with the resistance variation value;

in response to the resistance variation value exceeding a predetermined threshold, causing the battery cell to discharge through the conductive stretchable element; and controlling a switch, disposed between the battery cell and the conductive stretchable element, to close, wherein the battery cell discharges via the switch.

2. The method of claim 1, wherein the conductive stretchable element is a conductive label having printed thereon information about the battery cell.

3. The method of claim 1, wherein the conductive stretchable element is at least partially transparent.

4. The method of claim 1, further comprising generating a control voltage in accordance with the resistance variation value; and supplying the control voltage to the charging device to control the supply voltage delivered from the charging device.

5. The method of claim 1, further comprising reducing the supply voltage in response to an increasing resistance variation value.

6. The method of claim 5, further comprising reducing the supply voltage in discrete steps.

7. The method of claim 1, further comprising sensing an average resistance variation value of a plurality of conductive stretchable elements, and using the average resistance variation as the resistance variation value.

8. A method for monitoring and suppressing swelling of a battery cell and its nonconductive housing, comprising:

affixing a conductive stretchable element to the nonconductive housing;

sensing a resistance variation value of the conductive stretchable element as a result of the conductive stretchable element having been stretched due to swelling of the battery cell;

in response to the resistance variation value, controlling a charging device to decrease a supply voltage to the battery cell; and in response to the resistance variation value exceeding a predetermined threshold, closing a switch disposed between the battery cell and the conductive stretchable element to cause the battery cell to discharge through the switch and the conductive stretchable element.

9. The method of claim 8, wherein the conductive stretchable element is a conductive label having printed thereon information about the battery cell.

10. The method of claim 8, further comprising controlling the charging device by supplying a control voltage, generated based on the resistance variation value, to the charging device.

11. The method of claim 8, further comprising reducing the supply voltage in response to an increased resistance variation value.

12. The method of claim 11, further comprising reducing the supply voltage in steps.

13. A battery module, comprising:

a nonconductive housing;

a battery cell disposed in the nonconductive housing;

a conductive label affixed to the nonconductive housing;

a controller configured to detect a resistance variation value of the conductive label as result of swelling of the nonconductive housing, to generate a control voltage based on the resistance variation value of the conductive label, and to supply the control voltage to a charging device that charges the battery cell; and a switch disposed between the battery cell and the conductive label, wherein the controller is further configured to close the switch in response to the resistance variation value exceeding a predetermined threshold.

14. The battery module of claim 13, wherein the controller is further configured to, in response to the resistance variation value and via the control voltage, control the charging device to decrease a supply voltage to the battery cell.

15. The battery module of claim 14, wherein the controller is configured to decrease the supply voltage to the battery cell in steps.

* * * * *